3,257,192
METHOD OF KILLING DEEP-ROOTED WEEDS
Raymond W. Luckenbaugh, Wilmington, Del., and Edward J. Soboczenski, Chadds Ford, Pa., assignors to E. I. du Pont de Nemours and Company, Wilmington, Del., a corporation of Delaware
No Drawing. Filed Jan. 22, 1965, Ser. No. 427,493
14 Claims. (Cl. 71—2.5)

This application is a continuation-in-part of our copending application Serial No. 230,280 filed October 12, 1962, now abandoned, which in turn is a divisional application of our then copending application Serial No. 161,410 filed December 22, 1961, now abandoned, which in turn was a continuation-in-part of our then copending application Serial No. 840,539 filed September 17, 1959, now abandoned.

This invention relates to methods of killing plants and is more particularly directed to methods of killing plants with compounds of the following formula:

(I)

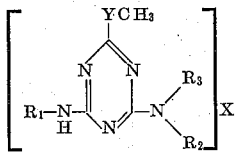

wherein:

$R_1$ and $R_2$ may be the same or different and are selected from the group consisting of alkyl of less than four carbon atoms and alkenyl of less than four carbon atoms, with the proviso that when the alkyl group contains three carbon atoms it can be terminally substituted with a methoxy group;
$R_3$ is selected from the group consisting of hydrogen and alkyl of less than four carbon atoms;
Y is oxygen or sulfur, and
X is an acid having an ionization constant greater than $2 \times 10^{-5}$.

During the past two decades or so there has been an increasing use of chemical herbicides. With the increase in use of such herbicides there developed selected areas of problems for which no available chemical was entirely appropriate. As a result the herbicides which were introduced to the market took on more and more of a specialized character.

For example, initially the most commonly employed chemical herbicides were inorganic chemicals such as the chlorates, borates and sulfonates. They were satisfactory for over-all weed control but they often only killed back the foliage and not the plant, they had very little residual activity and they required relatively high rates of application.

The development of the 2,4-D type of organic chemical herbicide in the mid 1940's made available a herbicide which gave complete kill of plants with better residual activity at lower rates. However, such herbicides were largely selective to broadleaf plants with little activity towards grassy plants.

Development of substituted urea herbicides in the early 1950's made available herbicides with a broad spectrum of activity coupled with prolonged soil persistence. However, in the area of industrial weed control rather high rates were necessary for control of deep-rooted plants because of low water solubility of the chemicals and high adsorbency in some soils.

Similarly, triazine derivatives developed in the early 1960's require relatively high use rates for industrial weed control because of low water solubility and high adsorbency in some soils.

Thus it is apparent that there is a real need for a chemical which possesses good herbicidal activity coupled with high water solubility and which can penetrate into highly adsorptive soils.

It has now been discovered that the s-triazines of this invention have a remarkable and unexpected capacity to form water-soluble compounds with a select group of acids. Moreover, these compounds are stable in either the solid state or in aqueous solutions.

The water solubility of the compounds of this invention is a distinct advantage in that it permits for the use of water as a solvent. Water costs less, is non-toxic, non-flammable and will not injure susceptible crops in the locus of application, unlike most oil or organic solvents. Of more importance, the water solubility of these compounds makes available a herbicide which is capable of controlling deep-rooted weeds in highly adsorptive soils at economical low rates due to their greater penetration and greater stability.

The stability of the water-soluble compounds of this invention also make it possible to form aqueous solutions or suspensions of the compounds for storage.

Acids can be either organic or inorganic acids and preferably have a dissociation constant of at least $2 \times 10^{-5}$, though not greater than $2.5 \times 10^{-1}$.

Typical of the acids within the scope of this invention are sulfuric acid, hydrochloric acid, acetic acid, monochloroacetic acid, dichloroacetic acid, trichloroacetic acid, 2,2-dichloropropionic acid, 2,2-dichlorobutyric acid, 2-chloropropionic acid, phosphoric acid, phosphorous acid, sulfamic acid, fumaric acid, maleic acid, dichloromaleic acid, malonic acid, oxalic acid, picric acid, pyrophosphoric acid, tartaric acid, sulfurous acid, salicylic acid, phthalic acid, 2,3,6-trichlorobenzoic acid and alkyl and aryl sulfonic acids, such as dodecylbenzenesulfonic acid and methylsulfonic acid.

The position of attachment of the acid, X, in the compounds of Formula I is not known. The importance of the methoxy or methylmercapto substituent is evident by the fact that 4,6-bis(alkylamino)-s-triazines containing halogen, hydroxyl or nitro groups in the 2-position do not form stable compounds with a given acid, X.

Acid salts of weak organic bases, such as those prepared from trichloroacetic acid and 3-(aryl)-1,1-dimethyl urea are known to dissociate in aqueous solution to their two components. However, aqueous solutions of the compounds of this invention are unexpectedly stable even when standing at room temperature for a month or longer.

The melting or decomposition temperatures of these compounds do not change when stored at room temperature for a month or longer, which shows their dry state stability.

The compounds of this invention can be conveniently transported in the dry stable powder form and mixed with water at the application site for spraying. Solutions of 1 to 3% concentration of active ingredient can be prepared, and in some examples higher concentrations are possible and may be preferred. This aqueous solubility of the compounds of this invention is greater than the range of aqueous solubility of other known commercial s-triazine herbicides.

In order to form the preferred compounds of this invention it is necessary to use a reasonably strong acid, HB, because the 2,4-bis(alkylamino)-6-methoxy and 6-methylmercapto-s-triazines are weak bases. The preferred acids, therefore, are those which have an aqueous dissociation constant of at least $2 \times 10^{-5}$, as noted above. Particularly preferred are the acids having an aqueous dissociation constant of at least $1 \times 10^{-3}$, though not greater than $2.5 \times 10^{-1}$.

PREPARATION

The compounds of the present invention may be prepared by reacting an acid as previously defined with the corresponding methoxy or methylmercapto-s-triazine from the class having the general formula:

(II)

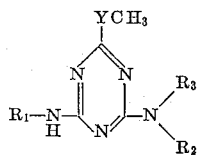

wherein:

Y, $R_1$, $R_2$, and $R_3$ have the definition as given in Formula I.

The methoxy and methylmercapto-s-triazines of Formula II are conveniently prepared by reacting the chloro-s-triazines as described by H. Gysin and E. Knüsli in U.S. 2,891,855 with sodium methoxide or sodium methylmercaptide in refluxing methanol. The sodium chloride is removed by filtration and the methoxy or methylmercapto-s-triazine is isolated from the filtrate. Additional information on preparation and properties of s-triazines are disclosed in French Patent 1,135,848 (1956), Gysin et al. U.S. Patent 2,909,420 (1959) and in an article by Contraulis and Banks, J. Am. Chem. Soc. 67, 1946 (1945).

To make the compounds of Formula I, one mixes a methoxy or methylmercapto-s-triazine of Formula II with the acid, X, preferably in the presence of a liquid aromatic hydrocarbon such as benzene, toluene, xylene or chlorobenzene at room temperature. In general, any aromatic hydrocarbon can be used, preferred ones being those which are liquid from about 20 to 35° C. and serve as solvents for the reactants. The ratio of the s-triazine compound to the acid is preferably always one to one, though certain variations can sometimes be used.

Reaction between the acid and the methoxy or methylmercapto-s-triazine compound takes place very quickly, usually within a matter of a few minutes, though sometimes reaction times of an hour or more are required for completeness. The product can be separated from the aromatic hydrocarbon by adding to the reaction medium an excess of a liquid paraffin hydrocarbon such as pentane, hexane, heptane, or commercial petroleum ether In general, preferred paraffin hydrocarbons are alkanes which are liquid at temperatures ranging from 20 to 35° C. In general, the products of the invention separate as either solids or oils.

The products can sometimes be prepared by simple mixing of the methoxy or methylmercapto-s-triazine and an excess of the acid. This method is preferred for some strong acids since less cleavage of the methoxy group occurs. Water and ethanol can be used to crystallize the products.

Further discussion and explanation for the preparation of the compounds of Formula I is found in an article by Hofman, in Ber d. Deut Chem. Ges., vol. 18, page 2775 (1885).

USE

To use the compounds of Formula I as herbicides, one can simply dissolve the solid in water and then spray a herbicidal quantity of the resulting solution upon a locus to be treated. They are highly effective herbicides especially preferred for their ability to kill grasses and other deep-rooted plants with utility for selective weed control in agricultural crops and for commercial soil sterilization.

The compounds of this invention are useful in selective weed control in crops such as corn, cotton and soya beans. They are particularly safe in corn and cotton while controlling weeds such as crabgrass, pigweed, lamb's-quarters, nutsedge and quackgrass.

Triazines, heretofore known as herbicidal, are known in the art to have little effectiveness in controlling quackgrass. However, the compounds of this invention quite unexpectedly give effective control of quackgrass.

COMPOSITIONS

The triazine addition compounds of this invention can be formulated as powders which are then dissolved when needed to form the herbicide spray solutions that are to be applied. While the active ingredients could be used without additives, greatly superior results are obtained when a triazine salt is blended with certain adjuvants, and is then ground to form a finely divided powder which will wet rapidly, disperse well, and then dissolve quickly in the spray. One group of adjuvants of importance are surface active agents. Non-ionic surface active agents, which improve wetting and dispersing, such as ethylene oxide adducts to fatty and rosin acids, reaction products of sorbitol fatty acid esters with ethylene oxide, and alkylphenol polyoxyethylenes are preferred.

Another group of surface active agents useful in these compositions are cationic surfactants such as fatty acid amine salts, long chain quaternaries, and the like. Examples are N-long-chain alkyl trimethyl ammonium chloride, alkyl (such as cetyl) dimethyl benzyl ammonium chloride, and the acetic acid salts of mixed fatty amines.

Anionic or amphoteric surface active agents can also be used, but they are less preferred because under certain circumstances they may cause precipitation of the triazine salt. Suitable examples are sodium and potassium oleate, the amine salts of oleic acids such as morpholine and dimethylamine oleates, the sulfonated animal and vegetable oils such as sulfonated fish and castor oils, sulfonated petroleum oils, sulfonated acyclic hydrocarbons, the sodium salts of lignin sulfonic acid (goulac), alkyl naphthalene sodium sulfonate and the sodium or triethanolamine salts of N-fatty β-aminopropionic acid. Other wetting, dispersing and emulsifying agents such as those listed in "Detergents and Emulsifiers 1964 Annual" by John W. McCutcheon, Inc. can also be used.

Generally the surface active agent will not comprise more than about 5 to 15% by weight of the composition depending, of course, upon the particular surface active agent, the system in which it is placed, and the result desired, and in certain compositions, the percentage will be 1% or less. Usually the minimum concentration will be 0.1%.

Another group of additives that are important in herbicidal compositions containing triazine addition compounds are corrosion inhibitors, such as boric acid, thiourea, phosphates (sodium dihydrogen phosphate) and long chain alkyl, amine quaternary salts.

Powder compositions may also contain diluents such as disodium phosphate, sodium acid sulfate, sodium chloride, and other water-soluble extenders to increase the convenience in handling and packaging. Such extenders may also serve as anticaking agents. Of course, small amounts of water-insoluble anticaking agents, such as fine silica or precipitated magnesium carbonate, may also be used.

Compositions of this invention may also contain adjuvants such as antifoam agents, dyes, and others.

Fertilizer materials, other herbicidal agents, and other pest control agents such as insecticides and fungicides can be included in the herbicidal compositions of the invention if desired.

Among other herbicides with which the triazine addition compounds of this invention can be mixed, materials which are water soluble are preferred. For example, ammonium sulfamate, aminotriazole, sodium trichloroacetate, sodium 2,2-dichloropropionate, salts of chlorinated benzoic acids, such as dimethylammonium 2,3,6-trichlorobenzoate, salts of 2,4-dichloro- and 2,4,5-trichlorophenoxyacetic acid are preferred agents.

The compounds of this invention can also be formulated as concentrated solutions in a non-aqueous solvent. For use such a mixture is ordinarily diluted in water to spray concentration, solvents which are usable with water are preferred. Typical are polar solvents such as dimethyl formamide and N-methyl pyrrolidone. If desired, adjuvants such as corrosion inhibitors, surface active agents, and the like, can be included in such compositions.

METHODS

The rate of application of the compounds of this invention in any given instance will vary with the particular compound employed, the purpose and type of application, the particular weeds to be controlled, and other such variables. Generally 1 to 5 lbs./acre of active ingredient are satisfactory for pre-emergence weed control depending on the soil type and agricultural crop. Directed post-emergence sprays can give effective weed control at rates as low as 0.25 to 0.5 pounds active compound per acre.

Higher rates such as 10–40 lbs./acre of active ingredient are usually employed for extended soil sterilization.

The invention is further illustrated by reference to the following examples:

Example 1

Fifteen parts by weight of trichloroacetic acid are dissolved in ninety parts by weight of reagent grade xylene at room temperature. Eighteen parts by weight of 2,4-bis(ethylamino)-6-methoxy-s-triazine are added to the solution. The resultant clear solution is allowed to stand at room temperature overnight. The pure 2,4-bis(ethylamino)-6-methoxy-s-triazine, 1/1 compound with trichloroacetic acid is precipitated by adding the solution to 3000 parts of n-hexane. Sixteen parts by weight of a white crystalline product are obtained. It melts at 106° C. with decomposition and is soluble in acetone.

Thirty-seven parts by weight of this compound are dissolved in two liters of water at room temperature giving a solution of approximately pH 5. No dissociation of this solution is evident on standing at room temperature for over two months.

*Analysis.*—Calc'd for $C_{10}H_{16}O_3Cl_3N_5$: C, 33.3; H, 4.4. Found: C, 33.6; H, 4.6.

This compound is applied at a rate of 20 pounds per acre of active ingredient in 100 gallons of water as a foliage spray to Johnsongrass seedlings. After three weeks the plants show severe injury followed by death. When applied as a pre-emergence treatment at a rate of two pounds per acre of active ingredient in sixty gallons of carrier, excellent control of millet, crabgrass, wild mustard, and amaranthus (pigweed) is obtained.

Example 2

Twenty-five parts of 2,4-bis(ethylamino)-6-methoxy-s-triazine and fifty parts of 100% phosphoric acid are mixed in an Erlenmeyer flask. Reaction is evident by a temperature rise from 25° C. to 60° C. A clear solution is obtained. Fifty parts of water is added and the mixture is filtered. The clear filtrate deposits a mass of fluffy white crystals. After being washed with cold ethanol, the crude product is recrystallized from 200 parts of ethanol. The 2,4-bis(ethylamino)-6-methoxy-s-triazine 1/1 compound with phosphoric acid (14 parts) is a white crystalline solid which melts at 173–176° C.

*Analysis.*—Calc'd for $C_8H_{18}N_5O_5P$: C, 32.6; H, 6.15; N, 23.9; P, 10.5. Neutral equivalent 147.6. Found: C, 32.3; H, 6.2; N, 23.5; P, 10.3. Neutral equivalent 149.

It is applied as a pre-emergence treatment, at a rate of two pounds per acre of active ingredient in 30 gallons per acre of water to crabgrass, millet, lamb's-quarter, pigweed, and wild mustard. This compound causes complete kill of the seedling plants.

Example 3

PREPARATION OF ADDITION COMPOUND FROM TRICHLOROACETIC ACID AND 2,4-BIS(ETHYLAMINO)-6-METHYLMERCAPTO-s-TRIAZINE

Twenty-one and three tenths parts by weight of 2,4-bis(ethylamino)-6-methylmercapto-s-triazine, is added to a solution of 16.4 parts by weight of trichloroacetic acid in 100 parts by volume of xylene. The clear solution is poured into 200 parts by volume of n-pentane after four hours. The precipitate is collected and washed with n-pentane. There is obtained 30 parts by weight of 2,4-bis(ethylamino)-6-methylmercapto-s-triazine 1/1 addition compound with trichloroacetic acid. It melts at 119° C. (with decomposition). A small sample is stirred with water at room temperature for 15 minutes. On filtering to drying the 2,4-bis(ethylamino)-6-methylmercapto-s-triazine 1/1 addition compound with trichloroacetic acid is isolated.

*Analysis.*—Calc'd for $C_{10}H_{16}Cl_3N_5O_2S$: C, 31.8; H, 4.3. Found: C, 31.9; H, 4.2.

Example 4

PREPARATION OF ADDITION COMPOUND FROM TRICHLOROACETIC ACID AND 2,4 - BIS(ISOPROPYLAMINO)-6-METHYLMERCAPTO-s-TRIAZINE

A solution of 1.7 parts by weight of trichloroacetic acid in 20 parts by volume of xylene is mixed with 2.4 parts by weight of 2,4-bis(isopropylamino)-6-methylmercapto-s-triazine. The clear solution on standing overnight precipitates a solid. The solid is filtered and washed with n-pentane. The product, 2 parts by weight, is essentially pure 2,4-bis(isopropylamino)-6-methylmercapto-s-triazine 1/1 addition compound with trichloroacetic acid. It melts at 127–127.5° C. (decomposition).

*Analysis.*—Calc'd for $C_{12}H_{20}Cl_3N_5O_2S$: N, 17.3. Found: N, 17.1.

Example 5

PREPARATION OF ADDITION COMPOUND FROM 2,3,6-TRICHLOROBENZOIC ACID AND 2,4 - BIS(ETHYLAMINO)-6-METHYLMERCAPTO-s-TRIAZINE

Ten and seven tenths parts by weight of crude 2,3,6-trichlorobenzoic acid, M.P. 96–100° C., is added to a solution of 2,4-bis(ethylamino)-6-methylmercapto-s-triazine, in 100 parts by volume of xylene. The mixture is warmed gently to 47° C. and then let stand overnight. The mixture is filtered and the filtrate evaporated to a viscous oil under vacuum on a steam bath. The oil is dissolved in a small amount of ether and diluted with n-pentane. On cooling in a Dry Ice acetone bath the product separates as a crystalline solid. There is obtained 13.5 parts by weight of 2,4-bis(ethylamino)-6-methylmercapto-s-triazine 1/1 addition compound with 2,3,6-trichlorobenzoic acid which melts at 114–117° C.

*Analysis.*—Calcd for $C_{15}H_{18}Cl_3N_5O_2S$: Cl, 24.3; N, 16.0. Found: Cl, 24.9; N, 15.0.

Example 6

PREPARATION OF ADDITION COMPOUND FROM TRICHLOROACETIC ACID AND 2-ETHYLAMINO-4-ISOPROPYLAMINO-6-METHYLMERCAPTO-s-TRIAZINE

Eleven and four tenths parts by weight of 2-ethylamino-4-isopropylamino-6-methylmercapto-s-triazine is added to a solution of 8.2 parts by weight of trichloroacetic acid in 50 parts by volume of xylene. After standing for four hours the clear solution is poured into 300 parts by volume of n-pentane. The product separates as an oil which crystallizes on scratching. There is obtained 15 parts by weight of 2-ethylamino-4-isopropylamino-6-methylmercapto-s-triazine 1/1 addition compound with trichloroacetic acid which melts at 99–100° C. with decomposition.

*Analysis.*—Calc'd for $C_{11}H_{18}Cl_3N_5O_2S$: C, 33.8, H, 4.6. Found: C, 35.3; H, 4.9.

Example 7

PREPARATION OF ADDITION COMPOUND FROM TRICHLOROACETIC ACID AND 2-ETHYLAMINO-4-ISOPROPYLAMINO-6-METHOXY-s-TRIAZINE

To a solution of 163 parts by weight of trichloroacetic acid in 433 parts by weight of xylene is gradually added 211 parts by weight of 2-ethylamino-4-isopropylamino-6-methoxy-s-triazine. The mixture is stirred at room temperature as a mild exothermic reaction takes place. The solution is allowed to stand overnight and then 1500 parts by weight of heptane is gradually added with stirring. The resulting solid is filtered off, washed with heptane and allowed to dry in air. It melts at 102–103° C.

Analysis.—Calc'd for $C_{11}H_{18}Cl_3N_5O_3$: C, 35.2; H, 4.8; N, 18.7. Found: C, 35.5; H, 5.0; N, 18.3.

Example 8

PREPARATION OF ADDITION COMPOUND FROM 2,3,6-TRICHLOROBENZOIC ACID AND 2,4-BIS(ETHYLAMINO)-6-METHOXY-s-TRIAZINE

A solution of 225 parts by weight of 2,3,6-trichlorobenzoic acid dissolved in 1730 parts by weight of xylene at 50° is stirred as 197 parts by weight of 2,4-bis(ethylamino)-6-methoxy-s-triazine is gradually added. Complete solution occurs. Upon standing, the solid product crystallizes out, and is filtered and dried. The addition compound of 2,3,6-trichlorobenzoic acid and 2,4-bis(ethylamino)-6-methoxy-s-triazine thus produced melts at 134–135° C.

Analysis.—Calc'd for $C_{15}H_{17}Cl_3N_5O_3$: C, 42.6; H, 4.0; Cl, 25.2. Found: C, 42.7; H, 4.5; Cl, 24.6.

EXAMPLE III

Examples 23–36

Using the method described in Example 3, 1/1 reaction compounds are obtained by mixing the following:

|    | 6-Methylmercapto-s-triazine | Parts by Weight Used | Hydrogen Acid (HB) | Parts by Weight Used |
|----|------------------------------|----------------------|--------------------|----------------------|
| 23 | 2,4-bis(isopropylamino)- | 22.5 | Trichloroacetic acid | 16.4 |
| 24 | 2-diethylamino-6-isopropylamino- | 23.9 | ___do___ | 16.4 |
| 25 | 2-diethylamino-6-ethylamino- | 22.5 | ___do___ | 16.4 |
| 26 | 2,4-bis(3-methoxypropylamino)- | 28.5 | ___do___ | 16.4 |
| 27 | 2-ethylamino-4-(3-methoxypropylamino)- | 24.1 | ___do___ | 16.4 |
| 28 | 2-ethylamino-4-allylamino- | 20.9 | ___do___ | 16.4 |
| 29 | 2-methylamino-4-allylamino- | 19.5 | ___do___ | 16.4 |
| 30 | 2,4-bis(isopropylamino)- | 22.5 | Phosphoric acid | 9.8 |
| 31 | 2-diethylamino-6-isopropylamino- | 23.9 | ___do___ | 9.8 |
| 32 | 2,4-bis(ethylamino)- | 19.7 | ___do___ | 9.8 |
| 33 | 2,4-bis(3-methoxypropylamino)- | 24.1 | ___do___ | 9.8 |
| 34 | 2-diethylamino-6-ethylamino | 22.5 | ___do___ | 9.8 |
| 35 | 2-ethylamino-4-(3-methoxypropylamino)- | 24.1 | ___do___ | 9.8 |
| 36 | 2-ethylamino-4-allylamino | 20.9 | ___do___ | 9.8 |

Example 37

The compound of Example 2 is mixed with the following ingredients and milled in a hammer mill to give a fine powder which dissolves quickly when added to water:

|  | Percent |
|---|---|
| Dihydrogen phosphate addition compound of 2,4-bis(ethylamino)-6-methoxy-s-triazine | 60.0 |
| Sodium dihydrogen phosphate (diluent, corrosion inhibitor) | 37.0 |
| Polyethylene oxide esters of mixed rosin and fatty acids concreted with urea | 3.0 |

TABLE I

Examples 9–15

Using the method described in Example 1, 1/1 reaction compounds are obtained by mixing the following:

|    | 6-Methoxy-s-triazines | Parts by Weight Used | Hydrogen Acid (HB) | Parts by Weight Used |
|----|------------------------|----------------------|--------------------|----------------------|
| 9  | 2,4-bis(isopropylamino)- | 22.5 | Trichloroacetic acid | 16.4 |
| 10 | 2-diethylamino-6-isopropylamino- | 23.9 | ___do___ | 16.4 |
| 11 | 2-diethylamino-6-ethylamino- | 22.5 | ___do___ | 16.4 |
| 12 | 2,4-bis(3-methoxypropylamino)- | 28.5 | ___do___ | 16.4 |
| 13 | 2-ethylamino-4-(3-methoxypropylamino)- | 24.1 | ___do___ | 16.4 |
| 14 | 2-ethylamino-4-allylamino- | 20.9 | ___do___ | 16.4 |
| 15 | 2-methylamino-4-allylamino- | 19.5 | ___do___ | 16.4 |

TABLE II

Examples 16–22

Using the method described in Example 2, 1/1 reaction compounds are obtained by mixing the following:

|    | 6-Methoxy-s-triazines | Parts by Weight Used | Hydrogen Acid (HB) | Parts by Weight Used |
|----|------------------------|----------------------|--------------------|----------------------|
| 16 | 2,4-bis(isopropylamino)- | 22.5 | Phosphoric acid | 9.8 |
| 17 | 2-diethylamino-6-isopropylamino- | 23.9 | ___do___ | 9.8 |
| 18 | 2,4-bis(ethylamino)- | 19.7 | ___do___ | 9.8 |
| 19 | 2,4-bis(3-methoxypropylamino)- | 24.1 | ___do___ | 9.8 |
| 20 | 2-diethylamino-6-ethylamino- | 22.5 | ___do___ | 9.8 |
| 21 | 2-ethylamino-4-(3-methoxypropylamino)- | 24.1 | ___do___ | 9.8 |
| 22 | 2-ethylamino-4-allylamino- | 20.9 | ___do___ | 9.8 |

Fifty pounds of this mixture is dissolved in 150 gallons of water and is applied as an over-all spray to a weed infestation on a vacant lot. Such weeds as Johnsongrass, quackgrass, crabgrass, watergrass, ragweed, flower-of-an-hour, velvetleaf, pigweed, and ragged robin are controlled.

The above formulation also has utility for the control of nutsedge as a soil-foliar spray. A field infested with a heavy stand of nutsedge is treated with 15 to 25 pounds of the active ingredient per acre in 60 gallons of water. At eight weeks after treatment a 70% reduction of the stand of nutsedge is noted.

*Examples 38–45*

The following compounds are substituted for the active compound of Example 37 in like amount by weight and are formulated in the same manner. They give substantially the same results when applied in 60 gallons of water.

| Examples: | Compound |
|---|---|
| 38 | 2,4 - bis(isopropylamino) - 6 - methoxy-s-triazine with trichloroacetic acid. |
| 39 | 2 - ethylamino - 4 - isopropylamino - 6-methoxy - s - triazine with trichloroacetic acid. |
| 40 | 2-diethylamino - 6 - isopropylamino - 6-methoxy - s - triazine with trichloroacetic acid. |
| 41 | 2 - diethylamino - 6 - ethylamino - 6-methoxy - s - triazine with trichloroacetic acid. |
| 42 | 2,4 - bis(3 - methoxypropylamino) - 6-methoxy - s - triazine with trichloroacetic acid. |
| 43 | 2 - ethylamino - 4 - (3 - methoxypropylamino) - 6 methoxy - s - triazine with trichloroacetic acid. |
| 44 | 2 - ethylamino - 4 - allylamino - 6 - methoxy - s - triazine with trichloroacetic acide. |
| 45 | 2 - methylamino - 4 - allylamino - 6 - methoxy - s - triazine with trichloroacetic acid. |

*Example 46*

An aqueous solution of the compound of Example 2 is prepared by mixing five pounds of the active ingredient and two pounds of alkyl naphthalene sodium sulfonate in twenty-five gallons of water. The resulting concentrate is diluted with water to equal a total of 40 gallons per acre. It is applied as a directed post-emergence treatment to weed seedlings in a corn field where the corn is 6 to 8 inches tall. Good control of annual grassy and broad leaf weeds is obtained.

*Examples 47–63*

The following compounds are each substituted for the active compound of Example 46 in like amount by weight and are formulated in the same manner. They give substantially the same results when applied in the same fashion.

| Examples: | Compound |
|---|---|
| 47 | 2,4 - bis(isopropylamino) - 6 - methoxy-s - triazine with 2,2 - dichloropropionic acid. |
| 48 | 2 - ethylamino - 4 - isopropylamino - 6-methoxy - s - triazine with salicylic acid. |
| 49 | 2,4 - bis(isopropylamino) - 6 - methoxy-s - triazine with dodecylbenzene sulfonic acid. |
| 50 | 2,4 - bis(n - propylamino) - 6 - methoxy-s - triazine with methane sulfonic acid. |
| 51 | 2,4 - bis(isopropylamino) - 6 - methoxy-s - triazine with boron trifluoride. |
| 52 | 2 - diethylamino - 6 - ethylamino - 6-methoxy - s - triazine with silicon tetrafluoride. |
| 53 | 2,4 - bis(isopropylamino) - 6 - methoxy-s - triazine with fumaric acid. |
| 54 | 2 - ethylamino - 4 - isopropylamino - 6-methoxy - s - triazine with dichloromaleic acid. |
| 56 | 2,4 - bis(isopropylamino) - 6 - methoxy-s - triazine with oxalic acid. |
| 55 | 2,4 - bis(isopropylamino) - 6 - methoxy-methoxy - s - triazine with malonic acid. |
| 57 | 2 - diethylamino - 6 - isopropylamino - 6-s - triazine with hydrochloric acid (aqueous concentrated). |
| 58 | 2,4 - bis(isopropylamino) - 6 - methoxy-s - triazine with concentrated sulfuric acid. |
| 59 | 2,4 - bis(ethylamino) - 6 - methoxy - s-triazine with sulfamic acid. |
| 60 | 2,4 - bis(3 - methoxypropylamino) - 6-methoxy - s - triazine with phosphoric acid. |
| 61 | 2,4 - bis(ethylamino) - 6 - methoxy - s-triazine with pyrosulfuric acid. |
| 62 | 2,4 - bis(isopropylamino) - 6 - methoxy-s - triazine with ferric chloride hexahydrate. |
| 63 | 2,4 - bis(ethylamino) - 6 - methoxy - s-triazine with mercuric chloride. |

*Example 64*

The following powder is prepared:

| | Percent |
|---|---|
| 2,4-bis(isopropylamino) - 6 - methoxy-s-triazine 1/1 salt with 2,2-dichloropropionic acid | 96.5 |
| Lauric alkylolamine condensate neutralized to pH 4 with HCl (surfactant) | 3.0 |
| Thiourea (inhibitor) | 0.5 |

The ingredients are mixed, blended, and ground in a hammer mill, using care to maintain a dry mix. The product dissolves in water, for example, to give a 2% solution. This formulation is applied at the rate of 40 lbs. per acre in 200 gallons water to a mixed infestation of grasses growing on a railroad siding. Good control of quackgrass, volunteer wheat, cheat and brome grass is obtained.

This formulation has particular utility for the control of quackgrass. An area containing a heavy infestation of quackgrass is plowed and disced. Shortly thereafter, the above formulation is applied at the rate of 4 pounds of active ingredient per acre in 40 gallons of water. At eight weeks after the treatment, excellent control is obtained.

*Example 65*

2,4-bis(ethylamino)-6-methoxy-s-triazine 1/1 addition compound with trichloroacetic acid also is formulated in the same manner in like amount by weight as the active compound of Example 64 and has substantially the same effect as the above-described active compound.

*Example 66*

Another powdered composition can be prepared as follows:

| | Percent |
|---|---|
| 2,4-bis(ethylamino) - 6 - methoxy-s-triazine 1:1 salt with sulfamic acid | 50.0 |
| Fatty alkylolamide condensate (surfactant) | 3.0 |
| Sodium sulfate | 41.0 |
| Sodium acid sulfate | 5.0 |
| Boric acid (corrosion inhibitor) | 1.0 |

The ingredients are mixed, blended, and ground in a hammer mill to yield a finely divided product having a particle size substantially less than 50 microns.

The above formulation is applied at a rate of 75 pounds per acre in 300 gallons water to winter annual weeds growing around grain elevators. These weeds include such species as volunteer wheat, oats, barley, cheat, chickweed, goatgrass, and little barley. Good control is obtained.

*Example 67*

A solution formulation can be prepared as follows. The phosphate salt of Example 2 is mixed with N-methylpyrrolidone and heated gently to form a solution containing 2 lbs. of salt per gallon of solution. This solution is convenient to use in that one gallon of concentrate, when mixed with 15 to 100 gallons of water will form spray solutions of suitable strength for application as a herbicide.

Six quarts of the concentrate in 20 gallons of water per acre applied as a directed post-emergence spray gives excellent control of young grass seedlings, such as crabgrass, barnyardgrass, and giant foxtail growing in safflower.

*Example 68*

The following powder is prepared in percent by weight:

| | Percent |
|---|---|
| 2-ethylamino-4-isopropylamino-6-methylmercapto-s-triazine, 1/1 addition compound with trichloroacetic acid | 50.0 |
| Fatty alkylolamide condensate | 3.0 |
| Sodium sulfate | 41.0 |
| Sodium acid sulfate | 5.0 |
| Boric acid | 1.0 |

The ingredients are mixed, blended, and ground in a hammer mill to yield a finely divided product having a particle size substantially less than 50 microns.

The above formulation is applied at a rate of 75 pounds per acre in 300 gallons of water to winter annual weeds growing around grain elevators. These weeds include such species as volunteer wheat, oats, barley, cheat, chickweed, goatgrass, and little barley. Good control is obtained.

*Examples 69–93*

The following compounds are substituted for the active compound in Example 68 in like amount by weight and each is formulated in the same manner.

They give substantially the same results when applied in 300 gallons of water.

Example: Compound
69 _____ 2,4-bis(ethylamino)-6-methylmercapto-s-triazine with trichloroacetic acid.
70 _____ 2,4-bis(isopropylamino)-6-methylmercapto-s-triazine with trichloroacetic acid.
71 _____ 2-diethylamino-6-isopropylamino-6-methylmercapto-s-triazine with trichloroacetic acid.
72 _____ 2-diethylamino-6-ethylamino-6-methylmercapto-s-triazine with trichloroacetic acid.
73 _____ 2,4-bis(3-methoxypropylamino)-6-methylmercapto-s-triazine with trichloroacetic acid.
74 _____ 2-ethylamino-4-(3-methoxypropylamino)-6-methylmercapto-s-triazine with trichloroacetic acid.
75 _____ 2-ethylamino-4-allylamino-6-methylmercapto-s-triazine with trichloroacetic acid.
76 _____ 2-methylamino-4-allylamino-6-methylmercapto-s-triazine with tricholoroacetic acid.

Example: Compound
77 _____ 2,4-bis(isopropylamino)-6-methylmercapto-s-triazine with 2,2-dichloropropionic acid.
78 _____ 2-ethylamino-4-isopropylamino-6-methylmercapto-s-triazine with salicylic acid.
79 _____ 2,4-bis(isopropylamino)-6-methylmercapto-s-triazine with dodecylbenzene sulfonic acid.
80 _____ 2,4-bis(n-propylamino)-6-methylmercapto-s-triazine with methane sulfonic acid.
81 _____ 2,4-bis(isopropylamino)-6-methylmercapto-s-triazine with boron trifluoride.
82 _____ 2-diethylamino-6-ethylamino-6-methylmercapto-s-triazine with silicon tetrafluoride.
83 _____ 2,4-bis(isopropylamino)-6-methylmercapto-s-triazine with fumaric acid.
84 _____ 2-ethylamino-4-isopropylamino-6-methylmercapto-s-triazine with dichloromaleic acid.
85 _____ 2-diethylamino-6-isopropylamino-6-methylmercapto-s-triazine with malonic acid.
86 _____ 2,4-bis(isopropylamino)-6-methylmercapto-s-triazine with oxalic acid.
87 _____ 2,4-bis(isopropylamino)-6-methylmercapto-s-triazine with hydrochloric acid (aqueous concentrated).
88 _____ 2,4-bis(isopropylamino)-6-methylmercapto-s-triazine with concentrated sulfuric acid.
89 _____ 2,4-bis(ethylamino)-6-methylmercapto-s-triazine with sulfamic acid.
90 _____ 2,4-bis(3-methoxypropylamino)-6-methylmercapto-s-triazine with phosphoric acid.
91 _____ 2,4-bis(ethylamino)-6-methylmercapto-s-triazine with pyrosulfuric acid.
92 _____ 2,4-bis(isopropylamino)-6-methylmercapto-s-triazine with ferric chloride hexahydrate.
93 _____ 2,4-bis(ethylamino)-6-methylmercapto-s-triazine with mercuric chloride.

The invention claimed is:
1. Method of killing deep-rooted weeds comprising the application to a locus to be protected of a herbicidally effective amount of a compound from the formula:

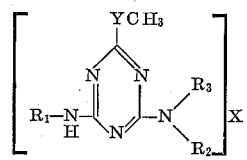

wherein
$R_1$ and $R_2$ are selected from the group consisting of alkyl of less than four carbon atoms and alkenyl of less than four carbon atoms, with the proviso that when the alkyl group contains three carbon atoms it can be terminally substituted with a methoxy group;
$R_3$ is selected from the group consisting of hydrogen and alkyl of less than four carbon atoms;
Y is selected from the group consisting of oxygen and sulfur; and
X is an acid selected from the group consisting of sulfuric acid, hydrochloric acid, acetic acid, monochloroacetic acid, dichloroacetic acid, trichloroacetic acid, 2-chloropropionic acid, phosphoric acid, sulfamic acid, fumaric acid, maleic acid, dichloromaleic acid, malonic acid, oxalic acid, picric acid, pyrophosphoric acid, tartaric acid, sulfurous acid, salicylic acid, phthalic acid, 2,3,6-trichlorobenzoic acid, alkyl sulfonic acids, aryl sulfonic acids, 2,2-dichloropropionic acid, 2,2-dichlorobutyric acid and phosphorous acid.

2. Method according to claim 1 wherein the compound applied is 2,4-bis(ethylamino)-6-methoxy-s-triazine, phosphoric acid.

3. Method according to claim 1 wherein the compound applied is 2,4-bis(ethylamino)-6-methoxy-s-triazine, trichloroacetic acid.

4. Method according to claim 1 wherein the compound applied is 2,4-bis(ethylamino)-6-methylmercapto-s-triazine, trichloroacetic acid.

5. Method according to claim 1 wherein the compound applied is 2,4-bis(isopropylamino)-6-methylmercapto-s-triazine, trichloroacetic acid.

6. Method according to claim 1 wherein the compound applied is 2,4-bis(ethylamino)-6-methylmercapto-s-triazine, 2,3,6-trichlorobenzoic acid.

7. Method according to claim 1 wherein the compound applied is 2-ethylamino-4-isopropylamino-6-methylmercapto-s-triazine, trichloroacetic acid.

8. Method according to claim 1 wherein the compound applied is 2-ethylamino-4-isopropylamino-6-methoxy-s-triazine, trichloroacetic acid.

9. Method according to claim 1 wherein the compound applied is 2,4-bis(ethylamino)-6-methoxy-s-triazine, 2,3,6-trichlorobenzoic acid.

10. Method according to claim 1 wherein the compound applied is 2-ethylamino-4-(3-methoxypropylamino)-6-methoxy-s-triazine, trichloroacetic acid.

11. Method according to claim 1 wherein the compound applied is 2-ethylamino-4-(3-methoxypropylamino)-6-methoxy-s-triazine, phosphoric acid.

12. Method according to claim 1 wherein the compound applied is 2,4-bis(isopropylamino)-6-methoxy-s-triazine, 2,2-dichloropropionic acid.

13. Method according to claim 1 wherein the compound applied is 2,4-bis(isopropylamino)-6-methylmercapto-s-triazine, dodecylbenzene sulfonic acid.

14. Method according to claim 1 wherein the compound applied is 2,4-bis(3-methoxypropylamino)-6-methylmercapto-s-triazine, phosphoric acid.

References Cited by the Examiner

UNITED STATES PATENTS 3,022,150 2/1962 Weed _____ 71—2.5
3,152,882 10/1964 Luckenbaugh _____ 71—2.5

FOREIGN PATENTS 337,540 3/1959 Switzerland.

LEWIS GOTTS, *Primary Examiner.*

JAMES O. THOMAS, Jr., *Examiner.*